No. 863,095. PATENTED AUG. 13, 1907.
O. D. ROUSSEAU.
AUTOMATIC PUMP FOR RUBBER TIRES.
APPLICATION FILED APR. 5, 1906.
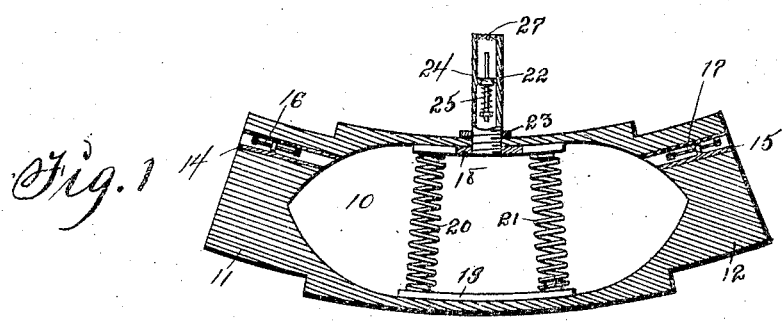
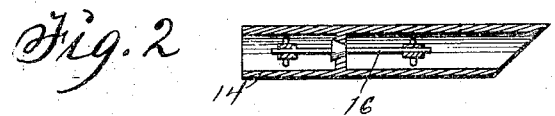
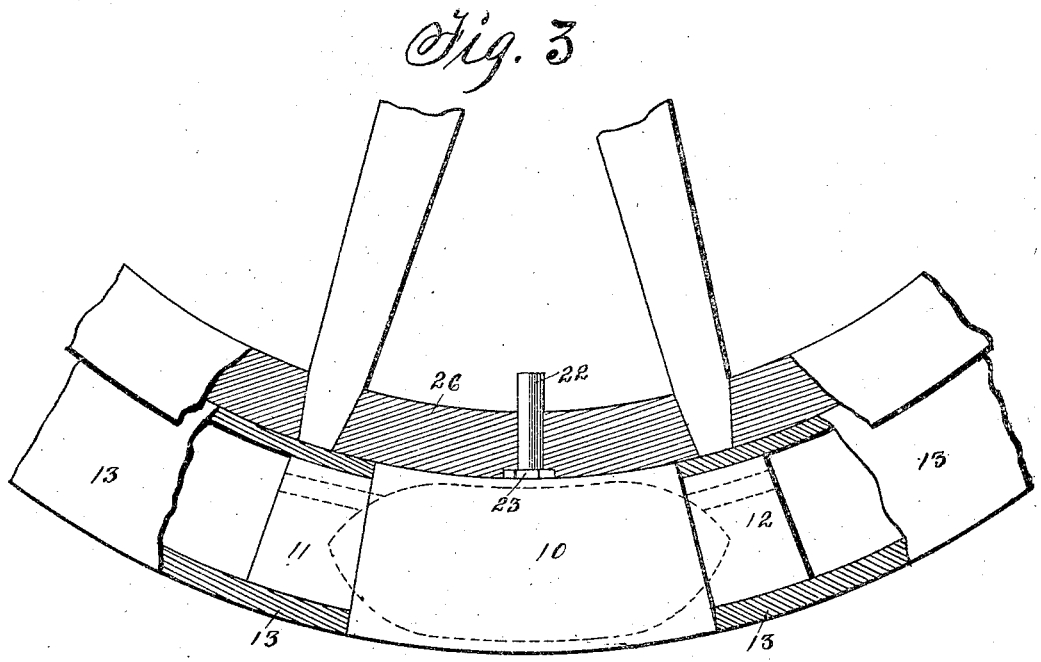

UNITED STATES PATENT OFFICE.

ORIEL D. ROUSSEAU, OF SEYMOUR, IOWA.

AUTOMATIC PUMP FOR RUBBER TIRES.

No. 863,095.

Specification of Letters Patent.

Patented Aug. 13, 1907.

Application filed April 5, 1906. Serial No. 310,130.

*To all whom it may concern:*

Be it known that I, ORIEL D. ROUSSEAU, a citizen of the United States, residing at Seymour, in the county of Wayne and State of Iowa, have invented a new and useful Automatic Pump for Rubber Tires, &c., of which the following is a specification.

The object of this invention is to provide improved means for inflating a pneumatic tire automatically during the use of said tire.

A further object of this invention is to provide improved means for maintaining the desired degree of inflation of pneumatic tires during the use and operation of said tires.

My invention consists in the construction, arrangement and combination of elements hereinafter set forth, pointed out in my claims and illustrated by the accompanying drawing, in which—

Figure 1 is a longitudinal section of a multiple valve device employed by me in equipping pneumatic tires. Fig. 2 is a detail sectional view of a portion of the multiple valve device. Fig. 3 is a detail elevation, partly in section, illustrating the mounting of a multiple valve device in a pneumatic tire.

In the construction of the device and its mounting as shown, the numeral 10 designates a valve-chamber, consisting of a tire section that has shoulders at its ends and is preferably made of yielding, compressible, elastic, resilient material, such as India-rubber vulcanized. The valve chamber preferably is circular in cross-section and of a length exceeding its diameter, and curved throughout its length on the same radius as the tire to which it is adapted to be applied. End portions 11, 12, of the valve-chamber 10, are reduced in diameter and are adapted to be inserted in open end portions of a tire 13, said tire being of the single-tube variety or type and vulcanized or cemented to said reduced end portions to form air-tight joints therewith. Apertures are formed in and longitudinally of the end portions of the valve-chamber 10 and afford communication between the interior of said valve-chamber and the interior of the tire 13. Valve-tubes, or casings, 14, 15 are mounted rigidly in the apertures in the end portions and contain egress check-valves 16, 17 normally held seated by pressure from the tire. Bearing-plates 18, 19 are mounted opposite each other within and longitudinally of the valve-chamber 10, and said plates are held separated and normally hold the valve-chamber expanded, by means of springs 20, 21 interposed between and engaging at their ends with said plates. A valve-tube 22 is fixed to the plate 18 and extends through the inner portion of the valve-chamber 10. A collar or jam-nut 23 is mounted on the valve-tube 22 and tends to compress the inner portion or wall of the valve-chamber 10 against the bearing plate 18 and prevent leakage at that point from the chamber. The valve-tube 22 contains an ingress check-valve 24 normally held seated by a spring 25 and aided by pressure from the valve-chamber. When mounted for use, the valve-tube 22 extends inwardly through the rim 26 of the wheel, and the inner end portion of said tube is fitted with a screen 27 to exclude foreign substances having a tendency to clog the valves.

In practical use, at each revolution of the wheel and tire, the outer portion of the valve-chamber 10 is brought in contact with the surface over which the wheel is advanced and the weight of the wheel and its load slightly compresses said valve-chamber and forces air out of it into the tire. When the wheel advances sufficiently to relax the compression of the valve-chamber, said chamber expands, through its normal resilience aided by the springs 20, 21, and sucks in air through the tube 22, the valves 16, 17 preventing return or air from the tire to said chamber. Successive compressions of the valve-chamber discharges more air to the tire, the valve 24 preventing escape of air from the chamber to the atmosphere. Continuous travel of the wheel and tire under a load, effects an inflation of the tire to the degree at which the back-pressure from the tire equals the force exerted by the compressing load, and thereafter the automatic action of the valve device maintains the desired degree of expansion or inflation of the tire.

I claim as my invention—

1. An automatic pump for pneumatic tires, comprising a yielding, compressible, elastic, resilient valve-chamber provided with shoulders at its ends and adapted to be mounted in and communicate with a tire as a section of the tire, valves in the ends of said chamber controlling the communication between the chamber and tire and a valve in said chamber intermediate of its ends and controlling communication between said chamber and the atmosphere.

2. In a tire, the combination of a single-tube, open at its ends, a valve-chamber consisting of a tire section having shoulders at its ends to engage the ends of the tube, expansive springs in said valve-chamber, a valve controlling communication between said chamber and the ends of the tire to which the valve-chamber is fitted and fixed, and a valve controlling communication between said chamber and the atmosphere.

3. The combination of a single-tube tire section open at its ends, a valve-chamber consisting of a tire section having shoulders at its ends fitted and fixed to the ends of the tire, a valve controlling communication between said valve chamber section and tire, bearing plates in said valve-chamber, expansive springs between said bearing-plates, a valve-tube affording communication between said chamber and the atmosphere, a valve in said valve-tube, and a screen in the outer end portion of said valve-tube.

ORIEL D. ROUSSEAU.

Witnesses:
A. M. JACKLEY,
C. P. BAFRICKMAN.